US010549477B2

United States Patent
Susnjara et al.

(10) Patent No.: US 10,549,477 B2
(45) Date of Patent: Feb. 4, 2020

(54) METHODS AND APPARATUS FOR CONTROLLING AN APPLICATOR HEAD DURING ADDITIVE MANUFACTURING

(71) Applicant: Thermwood Corporation, Dale, IN (US)

(72) Inventors: Kenneth J. Susnjara, Birdseye, IN (US); Nicolas Vote, Newburgh, IN (US)

(73) Assignee: Thermwood Corporation, Dale, IN (US)

( * ) Notice: Subject to any disclaimer, the term of this patent is extended or adjusted under 35 U.S.C. 154(b) by 269 days.

(21) Appl. No.: 15/435,416

(22) Filed: Feb. 17, 2017

(65) Prior Publication Data

US 2018/0236723 A1    Aug. 23, 2018

(51) Int. Cl.
*B29C 64/20*    (2017.01)
*B29C 64/194*    (2017.01)
*B33Y 10/00*    (2015.01)

(52) U.S. Cl.
CPC .......... *B29C 64/194* (2017.08); *B33Y 10/00* (2014.12)

(58) Field of Classification Search
CPC ... B29C 64/194; B29C 64/218; B29C 64/106; B29C 70/38; B29C 70/382; B29C 70/386; B29C 70/384; B29C 70/388; G05B 19/42
See application file for complete search history.

(56) References Cited

U.S. PATENT DOCUMENTS

| | | | |
|---|---|---|---|
| 4,588,872 A * | 5/1986 | Bollinger | B23K 7/102 219/124.34 |
| 5,431,749 A * | 7/1995 | Messner | B29C 70/388 156/358 |
| 7,731,816 B2 | 6/2010 | Oldani et al. | |
| 7,810,539 B2 | 10/2010 | Mischler et al. | |
| 8,151,854 B2 | 4/2012 | Oldani | |
| 8,534,338 B2 | 9/2013 | Oldani et al. | |
| 8,954,180 B2 | 2/2015 | Oldani | |
| 2007/0044899 A1 | 3/2007 | Tingley | |
| 2008/0006017 A1 | 1/2008 | Rindels | |
| 2010/0200168 A1 | 8/2010 | Oldani et al. | |
| 2016/0136885 A1 * | 5/2016 | Nielsen-Cole | B33Y 30/00 425/462 |
| 2017/0028634 A1 * | 2/2017 | Evans | B29C 69/001 |
| 2018/0050502 A1 | 2/2018 | Oldani | |

OTHER PUBLICATIONS

Chuang H, Liu C. Cross-Coupled Adaptive Feedrate Control for Multiaxis Machine Tools. ASME. J. Dyn. Sys., Meas., Control. 1991;113(3):451-457. doi:10.1115/1.2896431. (Year: 1991).*

* cited by examiner

*Primary Examiner* — Galen H Hauth
(74) *Attorney, Agent, or Firm* — Bookoff McAndrews, PLLC (57) ABSTRACT

Embodiments of the present disclosure are drawn to additive manufacturing methods. An exemplary method may include determining x and y coordinates for a tool path of an additive manufacturing machine, and calculating an angle of the tool path. The method may also include determining a position of a compression roller relative to the angle of the tool path, and moving the compression roller to position the compression roller relative to the angle of the tool path.

20 Claims, 5 Drawing Sheets

METHODS AND APPARATUS FOR CONTROLLING AN APPLICATOR HEAD DURING ADDITIVE MANUFACTURING

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, such as, e.g., three-dimensional (3D) printing manufacturing techniques or processes.

BACKGROUND

Additive manufacturing techniques and processes generally involve the buildup of one or more materials, e.g., by layering, to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including, e.g., freeform fabrication, 3D printing, rapid prototyping/tooling, etc. Additive manufacturing techniques may be used to fabricate simple or complex components from a wide variety of materials. For example, a freestanding object may be fabricated from a computer-aided design (CAD) model.

A particular type of additive manufacturing is more commonly known as 3D printing. One such process, commonly referred to as Fused Deposition Modeling (FDM), comprises a process of melting a thin layer of a flowable material (e.g., a thermoplastic material), and applying this material in layers to produce a final part. This is commonly accomplished by passing a continuous, thin filament of thermoplastic material through a heated nozzle, which melts the thermoplastic material and applies it to the structure being printed, building up the structure. The heated material is applied to the existing structure in thin layers, melting and fusing with the existing material to produce a solid finished product.

The filament used in the aforementioned process is generally produced using an extruder. In some instances, the extruder may include a specially designed screw rotating inside of a barrel. The barrel may be heated. Thermoplastic material in the form of small pellets may be introduced into one end of the rotating screw. Friction from the rotating screw, combined with heat from the barrel, softens the plastic, which then is forced under pressure through a small opening in a die attached to the front of the extruder barrel. This extrudes a string of material, which may be cooled and coiled up for use in the 3D printer as the aforementioned filament of thermoplastic material.

Melting a thin filament of material in order to 3D print an item may be a slow process, which may only be suitable for producing relatively small items or a limited number of items. As a result, the melted filament approach to 3D printing may be too slow for the manufacture of large items or a larger number of items. However, 3D printing using molten thermoplastic materials offers many benefits for the manufacture of large items or a large numbers of items.

A common method of additive manufacturing, or 3D printing, generally includes forming and extruding a bead of flowable material (e.g., molten thermoplastic), applying the bead of material in a strata of layers to form a facsimile of an article, and machining such facsimile to produce an end product. Such a process is generally achieved by means of an extruder mounted on a computer numeric controlled (CNC) machine with controlled motion along at least the x-, y-, and z-axes. In some cases, the flowable material, such as, e.g., molten thermoplastic material, may be infused with a reinforcing material (e.g., strands of fiber or other suitable material or combination of materials) to enhance the material's strength. The flowable material, while generally hot and pliable, may be deposited upon a substrate (e.g., a mold), pressed down or otherwise flattened to some extent, and/or leveled to a consistent thickness, preferably by means of a compression roller mechanism. The compression roller may be mounted in or on a rotatable carrier, which may be operable to maintain the roller in an orientation tangential, e.g., perpendicular, to the deposited material (e.g., bead or beads). The flattening process may aid in fusing a new layer of the flowable material to the previously deposited layer of the flowable material. The deposition process may be repeated so that successive layers of flowable material are deposited upon an existing layer to build up and manufacture a desired component structure. When executed properly, the new layer of flowable material may be deposited at a temperature sufficient enough to allow the new layer of such material to melt and fuse with a previously deposited layer, thus producing a solid part.

In some instances, the process of 3D printing a part may involve a two-step process. For example, the process may involve utilization of a large print bead to achieve an accurate final size and shape. This two-step process, commonly referred to as near-net-shape, may begin by printing a part to a size slightly larger than needed, then machining, milling, or routing the part to the final size and shape. The additional time required to trim the part to final size may be compensated for by the faster printing process.

In the practice of the aforementioned process, some disadvantages have been encountered. In 3D printing, it may be desirable to control the compression roller so that the compression roller follows behind the nozzle. When controlling the compression roller, an axis of the compression roller should remain transverse, e.g., perpendicular, to a direction of linear axis motion of the nozzle. The perpendicular orientation of the compression roller's rotational axis, relative to the direction of the CNC tool path, may be maintained by driving the rotatable carrier mechanism of the compression roller with a servomotor. A servomotor in a CNC system may be controlled by the CNC control, pursuant to an inputted CNC tool-path program. In order to control a rotary axis in this manner, the program code for the additional rotary axis is generally integrated with the tool-path code, which is generated off-line through a CAD software system or other suitable software for generating a CNC tool-path program. At the present time, CNC additive manufacturing tool-path generating software may not have the capability of integrating compression-roller tracking control into a workpiece program. Additionally, if this were accomplished, problems may develop if such a program were to be executed, because the control may attempt to coordinate rotation of the compression-wheel carrier axis with the linear motion required to move the linear axes of the machine. Interaction between the linear axis motion of the programmed tool path and the rotational motion of the compression roller may cause multiple starts and stops in the program. Frequent and/or multiple starts and stops in the CNC tool-path program could result in unacceptable or rough program execution.

One approach to eliminating the need to program the compression roller control axis is to have the control monitor the program movement slightly ahead of execution, and then automatically create the CNC code required to properly position the wheel behind the nozzle orthogonally. This code may then be integrated with the program code, eliminating the need for the CAD program software to create the necessary program code off-line. This approach, however, may not eliminate the previously described axis-coordination problems and the resulting unacceptably rough operation. Thus, methods and apparatus are needed to produce tracking and/or control of a compression roller to allow the compression roller to follow behind a nozzle and remain transverse, e.g., perpendicular, to the direction of linear axis motion of the nozzle when 3D printing.

SUMMARY

Aspects of the present disclosure relate to, among other things, methods and apparatus for fabricating components via additive manufacturing, such as, e.g., 3D printing techniques. Each of the aspects disclosed herein may include one or more of the features described in connection with any of the other disclosed aspects.

An object of the present invention is to provide a method for maintaining the rotational axis of the previously-described material compression roller of a CNC additive manufacturing machine, in a continuous orthogonal relationship with the programmed tool path of said machine, so as to facilitate smooth, tangential following of said roller, without the objectionable roughness typically encountered, due to the inherent axis-integration characteristics of a CNC machine control. The principal object is achieved by providing a discrete servo-control loop, to operate the rotatable carrier mechanism of the compression wheel. The servo-loop, which is not integrated with machine servo-control system, monitors the direction of the tool path at predetermined intervals, and rotates the carrier mechanism in the proper orientation to maintain orthogonal alignment with the tool-path direction.

In one aspect, the present disclosure is directed to additive manufacturing methods. An exemplary method may include determining x and y coordinates for a tool path of an additive manufacturing machine, and calculating an angle of the tool path. The method may also include determining a position of a compression roller relative to the angle of the tool path, and moving the compression roller to position the compression roller relative to the angle of the tool path.

In another aspect, the present disclosure is directed to an additive manufacturing method for delivering a flowable material from a nozzle of a programmable computer numeric control (CNC) machine. The method may include moving the nozzle along a tool path by sending x- and y-axis signals to a first servomotor configured to control movement of the nozzle, sampling the x- and y-axis signals to calculate an angle of the tool path, and determining a position of a compression roller relative to the tool path, wherein the compression roller is configured to follow the nozzle along the tool path. The method may further include moving the compression roller so that the compression roller is oriented perpendicular to the tool path, if the compression roller is not oriented perpendicular to the tool path. Movement of the compression roller may be controlled by a second servomotor, independent of the first servomotor configured to control movement of the nozzle.

As used herein, the terms "comprises," "comprising," or any other variation thereof, are intended to cover a non-exclusive inclusion, such as a process, method, article, or apparatus. The term "exemplary" is used in the sense of "example," rather than "ideal."

It may be understood that both the foregoing generation description and the following detailed description are exemplary and explanatory only and are not restrictive of the disclosure, as claimed.

BRIEF DESCRIPTION OF THE DRAWINGS

The accompanying drawings, which are incorporated in, and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating components via additive manufacturing techniques, such as, e.g., 3D printing. More particularly, the methods and apparatus described herein comprise a method for maintaining a transverse, e.g., orthogonal, relationship between a compression roller and a programmed tool path of a CNC additive manufacturing machine. For example, a rotational centerline of the compression roller may be maintained in line with the programmed tool back of the CNC machine, and the compression roller may be maintained in an orthogonal position relative to the tool path. Positioning of the compression roller may be controlled by an independent servo control. For example, an independent servo control may control a carrier mechanism upon which the compression roller is mounted, and the carrier mechanism may be a movable, e.g., rotatable or pivotable, to adjust the positioning of the compression roller in response to the servo control. In some embodiments, rather than controlling a carrier mechanism, the independent servo control may directly control positioning and/or location of the compression roller. For purposes of brevity, the methods and apparatus described herein will be discussed in connection with the fabrication of parts from thermoplastic materials. However, those of ordinary skill in the art will readily recognize that the disclosed apparatus and methods may be used with any flowable material suitable for additive manufacturing, such as, e.g., 3D printing.

Figure 1:
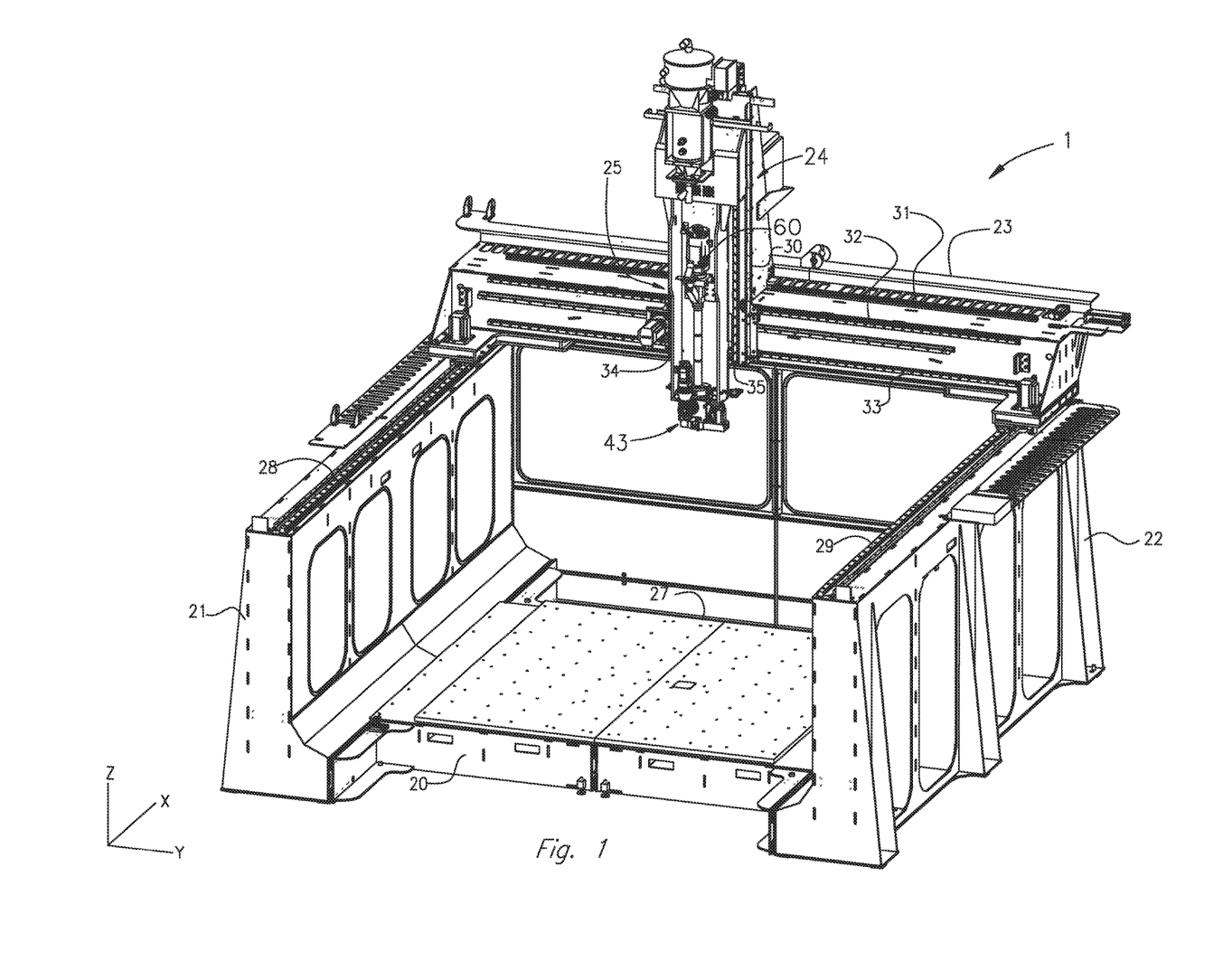
FIG. 1 is a perspective view of an exemplary CNC machine operable pursuant to an additive manufacturing process in the formation of articles, according to an aspect of the present disclosure.

With reference now to FIG. 1 of the drawings, there is illustrated a programmable computer numeric control (CNC) machine 1 embodying aspects of the present disclosure. A controller (not shown) may be operatively connected to CNC machine 1 for displacing an application nozzle along a longitudinal line of travel, or x-axis, a transverse line of travel, or a y-axis, and a vertical line of travel, or z-axis, in accordance with a program inputted or loaded into the controller for performing an additive manufacturing process to form a desired component. CNC machine 1 may be configured to print or otherwise build 3D parts from digital representations of the 3D parts (e.g., AMF and STL format files) programmed into the controller. For example, in an extrusion-based additive manufacturing system, a 3D part may be printed from a digital representation of the 3D part in a layer-by-layer manner by extruding a flowable material. The flowable material may be extruded through an extrusion tip or nozzle carried by a print head of the system, and the flowable material may be deposited as a sequence of beads or layers on a substrate in an x-y plane. The extruded, flowable material may fuse to previously deposited material and may solidify upon a drop in temperature. The position of the print head relative to the substrate may then be incrementally advanced along a z-axis (perpendicular to the x-y plane), and the process may then be repeated to form a 3D part resembling the digital representation.

CNC machine 1 shown in FIG. 1 includes a bed 20 provided with a pair of transversely spaced side walls 21 and 22, a gantry 23 supported on one or more of side walls 21 and 22, carriage 24 mounted on gantry 23, a carrier 25 mounted on carriage 24, an extruder 60, and an applicator head 43 mounted on carrier 25. Located on bed 20 between side walls 21 and 22 is a worktable 27 provided with a support surface. The support surface may be disposed in an x-y plane, and may be fixed or displaceable along an x-axis or a y-axis. For example, in a displaceable version, worktable 27 may be displaceable along a set of rails mounted on bed 20. Displacement of worktable 27 may be achieved using one or more servomotors and one or more of rails 28 and 29 mounted on bed 20 and operatively connected to worktable 27. Gantry 23 is disposed along a y-axis, supported on side walls 21 and 22. In FIG. 1, gantry 23 is mounted on a set of guide rails 28, 29, which are located along a top surface of side walls 21 and 22. Gantry 23 may either be fixedly or displaceably mounted, and, in some aspects, gantry 23 may be disposed along an x-axis. In an exemplary displaceable version, one or more servomotors may control movement of gantry 23. For example, one or more servomotors may be mounted on gantry 23 and operatively connected to tracks, e.g., guide rails 28, 29, provided on the side walls 21 and 22 of bed 20.

Carriage 24 is supported on gantry 23 and is provided with a support member 30 mounted on and displaceable along one or more guide rails 31, 32, and 33 provided on gantry 23. Carriage 24 may be displaceable along a y-axis on one or more guide rails 31, 32, and 33 by a servomotor mounted on the gantry 23 and operatively connected to support member 30. Carrier 25 is mounted on one or more vertically disposed guide rails 34 and 35 supported on carriage 24 for displacement of carrier 25 relative to carriage 24 along a z-axis. Carrier 25 may be displaceable along the z-axis by a servomotor mounted on carriage 24 and operatively connected to carrier 25.

Figure 2:
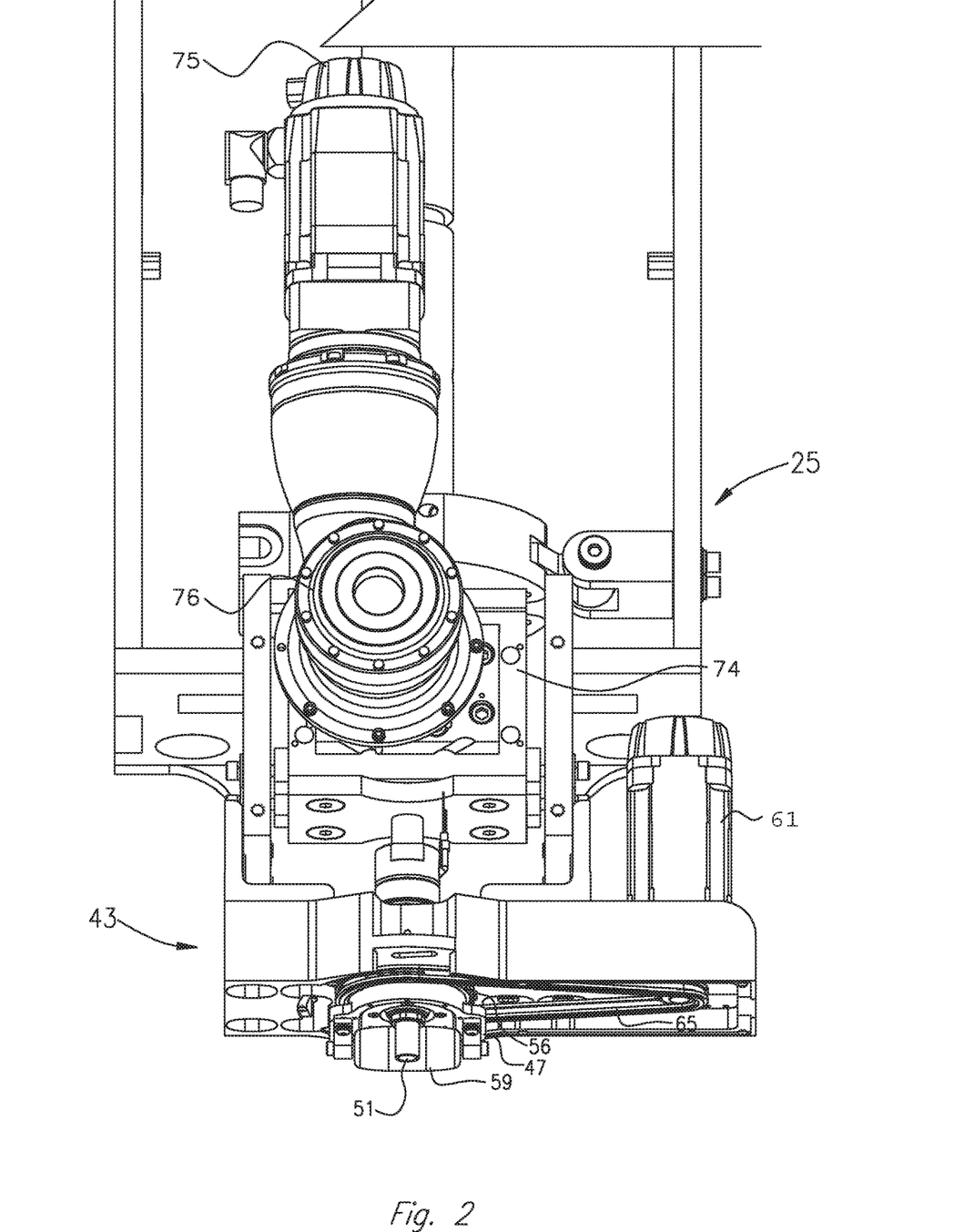
FIG. 2 is an enlarged perspective view of an exemplary applicator head assembly of the exemplary CNC machine shown in FIG. 1.
Figure 3:
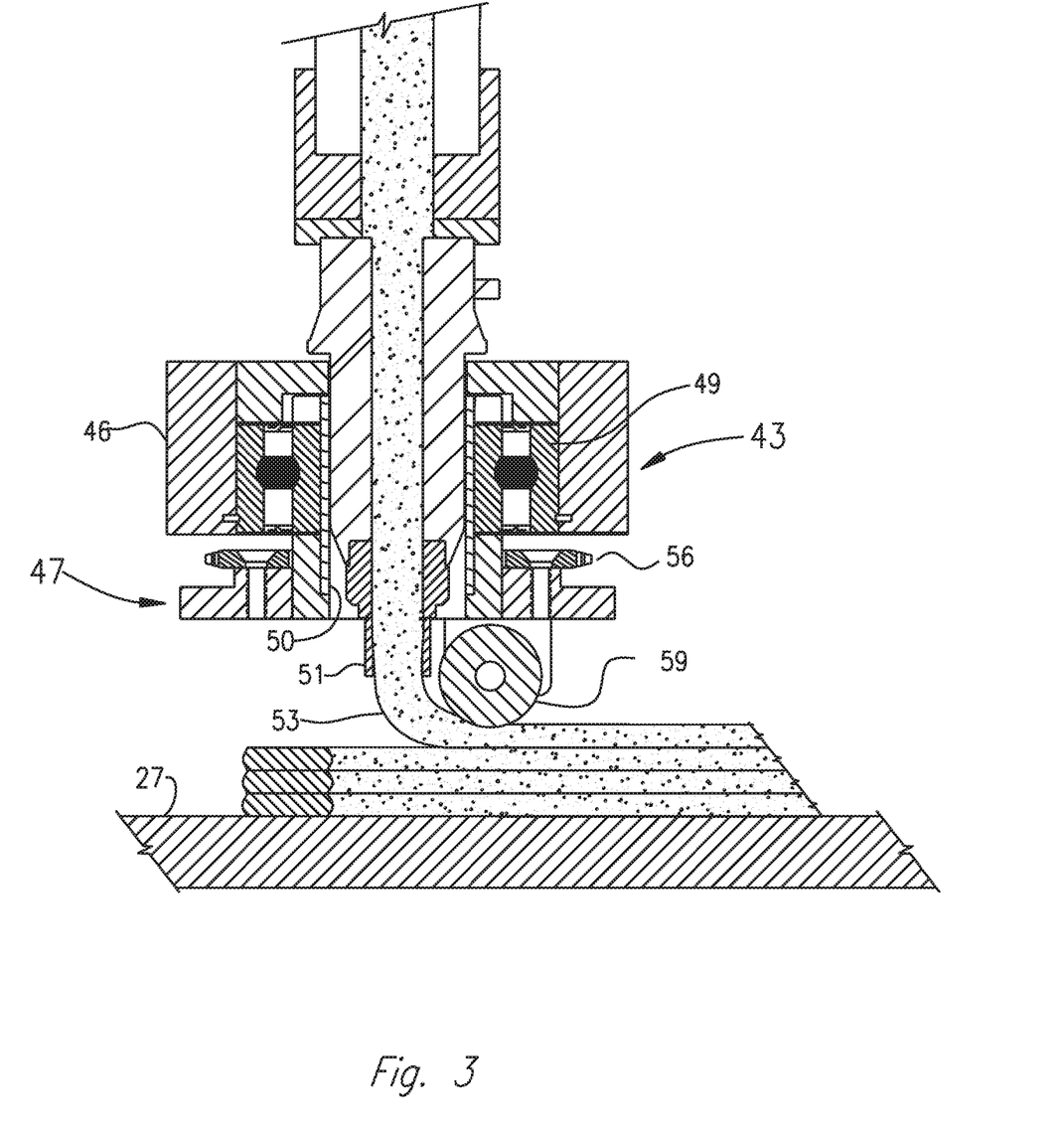
FIG. 3 is an enlarged cross-sectional view of an exemplary applicator head as shown in FIG. 2 during use.

As best shown in FIG. 2, mounted to carrier 25 is a positive displacement gear pump 74, which may be driven by a servomotor 75, through a gearbox 76. Gear pump 74 receives molten plastic from extruder 60, shown in FIG. 1. A compression roller 59 for compressing material may be mounted on carrier bracket 47. Compression roller 59 may be movably mounted on carrier 47, for example, rotatably or pivotably mounted. Compression roller 59 may be mounted so that a center portion of compression roller 59 is aligned with nozzle 51, and compression roller 59 may be oriented tangential to nozzle 51. Compression roller 59 may be mounted relative to nozzle 51 so that material, e.g., one or more beads of flowable material (such as thermoplastic resin), discharged from nozzle 51 is smoothed, flattened, leveled, and/or compressed by compression roller 59, as depicted in FIG. 3. One or more servomotors 61 may be configured to move, e.g., rotationally displace, carrier bracket 47 via a sprocket 56 and drive-chain 65 arrangement, or by any other suitable means.

With reference to FIG. 3, applicator head 43 may include a housing 46 with a roller bearing 49 mounted therein. Carrier bracket 47 may be mounted, e.g., fixedly mounted, to an adaptor sleeve 50, journaled in bearing 49. As shown in FIG. 3, a bead of a flowable material 53 (e.g., a thermoplastic material) under pressure from a source (e.g., one or more extruder 60 and an associated polymer or gear pump) disposed on carrier 25 may be flowed to applicator head 43, which may be fixedly (or removably) connected to, and in communication with, nozzle 51. In use, flowable material 53 (e.g., melted thermoplastic material) may be heated sufficiently to form a molten bead thereof, which may be delivered through applicator nozzle 51 to form multiple rows of deposited material 53 in the form of molten beads, as described herein, on a surface of worktable 27. In some embodiments, flowable material 53 may include a suitable reinforcing material, such as, e.g., fibers, that facilitate and enhance the fusion of adjacent layers of extruded flowable material 53. In an example, flowable material 53 may be heated sufficiently to form a molten bead and may be delivered through nozzle 51 to form multiple rows of deposited flowable material onto a surface of worktable 27. In some aspects, flowable material 53 delivered onto a surface of worktable 27 may be free of trapped air, the rows of deposited may be uniform, and/or the deposited material may be smooth. For example, flowable material 53 may be flattened, leveled, and/or fused to adjoining layers by any suitable means (e.g., compression roller 59), to form an article. In an example, a tangentially-oriented compression roller 59 may be used to compress flowable material 53 discharged from nozzle 51.

Although compression roller 59 is depicted as being integral with applicator head 43, compression roller 59 may be separate and discrete from applicator head 43. In some embodiments, compression roller may be removably mounted to machine 1. For example, different sized or shaped compression rollers 59 may be interchangeably mounted on machine 1, depending, e.g., on the type of flowable material 53 and/or desired characteristics of the rows of deposited flowable material formed on worktable 27.

In an example, machine 1 may include a velocimetry assembly (or multiple velocimetry assemblies) configured to determine flow rates (e.g., velocities and/or volumetric flow rates) of deposited flowable material 53 being delivered from applicator head 43. The velocimetry assembly may transmit signals relating to the determined flow rates to the aforementioned controller coupled to machine 1, which then may utilize the received information to compensate for variations in the material flow rates.

In the course of fabricating an article or component, pursuant to the methods described herein, the control system of machine 1, in executing the inputted program, may control several servomotors described above to displace gantry 23 along the x-axis, displace the carriage 24 along the y-axis, displace the carrier 25 along the z-axis, and/or rotate carrier bracket 47 about the z-axis while nozzle 51 deposits flowable material 53 and compression roller 59 compresses the deposited material. In an example, compression roller 59 may compress flowable material 53 in uniform, smooth rows of deposited material 53.

Figure 4:
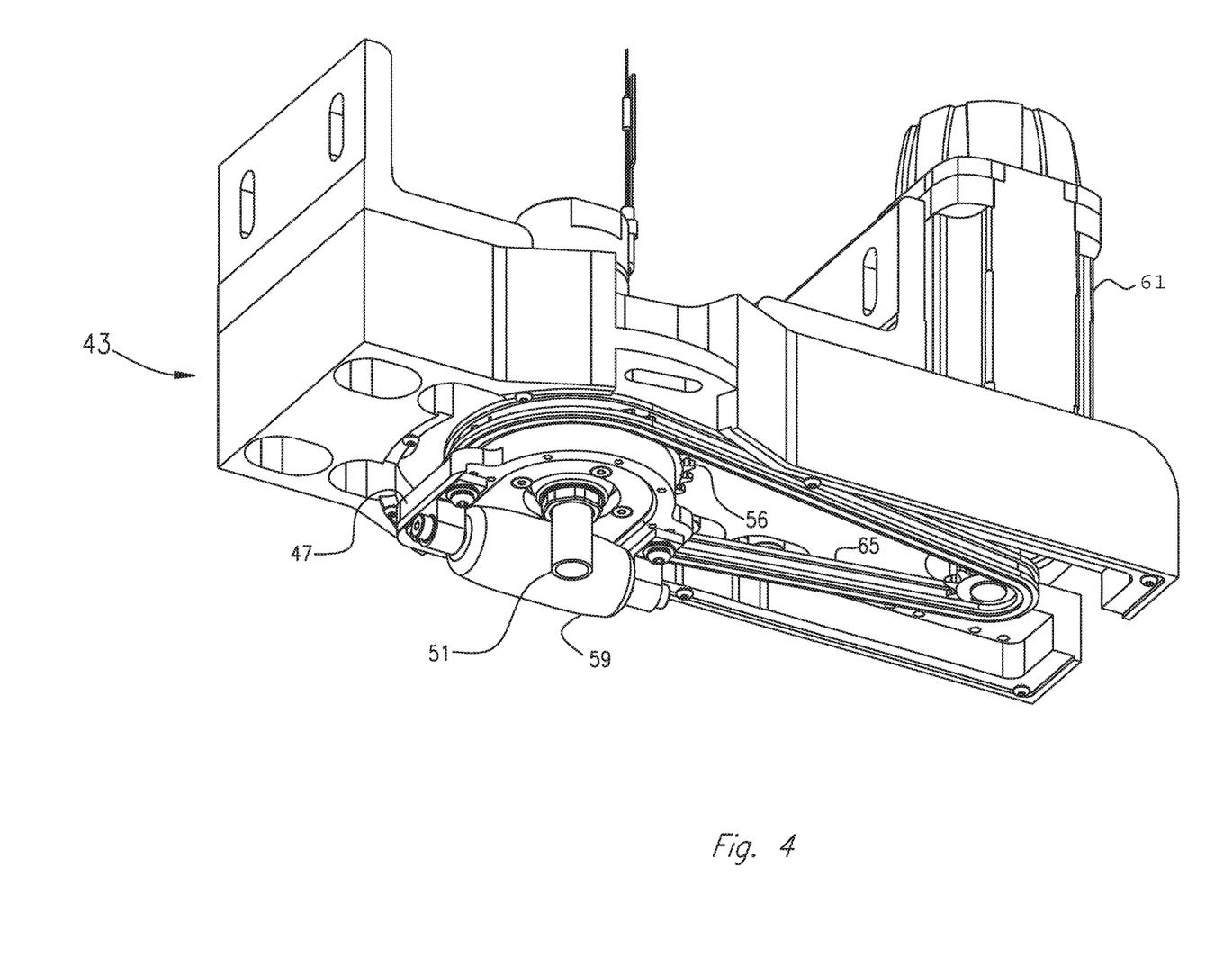
FIG. 4 is an enlarged, bottom, perspective view of an applicator head of the exemplary applicator head shown in FIG. 2.

FIG. 4 shows an enlarged perspective view of the underside of an exemplary applicator head 43. In FIG. 4, compression roller 59 is located behind nozzle 51 and perpendicular to the direction of movement of rotating carrier bracket 47. In other words, when the nozzle 51 is advanced in a direction while depositing flowable material 53, compression roller 59 is oriented to trail behind nozzle 51. When compression roller 59 trails nozzle 51, a longitudinal axis of compression roller 59 is oriented transverse to, e.g., perpendicular to, the direction of movement of carrier bracket 47. In an example, carrier bracket 47 may be rotated by servomotor 61 via a chain 65 and pulley 56 arrangement. In other examples, carrier bracket 47 may be configured to be controlled, e.g., rotated, by servomotor 61 through other suitable means. For example, in some aspects, a rotary actuator may be used to control angular or linear position, velocity, and/or acceleration of carrier bracket 47. Servomotor 61 may in turn be controlled by a servo loop that is independent of and separate from operation of the CNC program code. For example, a program code for controlling servomotor 61 may not be related to or affected by CNC additive manufacturing tool-path generating software.

In the course of fabricating a component, pursuant to the methods described herein, the control system of machine 1, in executing the inputted program, may operate the one or more servomotors as described to displace the gantry 23 along the x-axis, displace the carriage 24 along the y-axis, and/or displace the carrier 25 along a z-axis, to provide the desired end product or a near-duplicate thereof. A separate program may be used to control movement of servomotor 61, independent from the tool-path-generating program.

During application and compression of beads of flowable material (e.g., thermoplastic material) to form an article, the rotational axis of compression roller 59 is controlled by the separate program for servomotor 61 so that compression roller 59 remains tangential and orthogonal to the row of deposited beads of material. In order to achieve accurate, orthogonal tracking, the present disclosure provides a separate servo loop, independent of the control servo system of the machine 1, to rotate carrier bracket 47 and/or compression roller 59 about a vertical-axis thereof. The independent servo loop is not integrated with the machine 1 servo system. In operation, the independent servo loop, and associated program, does not receive commands from the inputted tool-path program. In operation, x- and y-axis positional information from the main control computer is sampled, e.g., continuously or incrementally. For example, positional information may be sampled from the main control computer at regular or variable intervals. For example, positional information may be sampled in 2-millisecond intervals, or intervals of more or less than 2 milliseconds, e.g., in fractions of a second or on the order of one or more seconds. Furthermore, angular deviations in the direction of the tool path are computed by the machine control computer and introduced into the independent servo loop of the compression-roller carrier bracket 47, as shown in FIG. 4. The servo loop responds to a detected change in the tool-path direction by moving, e.g., rotating the carrier bracket 47 in a direction to maintain the rotational axis of compression roller 59 in orthogonal alignment with the direction of travel of the tool path. In other words, the independent servo loop corresponding to independent servomotor 61 may rotate carrier bracket 47 such that a longitudinal axis of compression roller 59 is perpendicularly aligned with the direction of travel of the tool path and nozzle 51. Alternatively, if a different configuration for mounting compression roller 59 is used, then the independent servo loop corresponding to independent servomotor 61 may rotate compression roller 59 directly or may rotate another mechanism on which compression roller 59 is mounted in order to position compression roller 59 so that it is perpendicularly aligned with the direction of travel of the tool path and nozzle 51.

Figure 5:
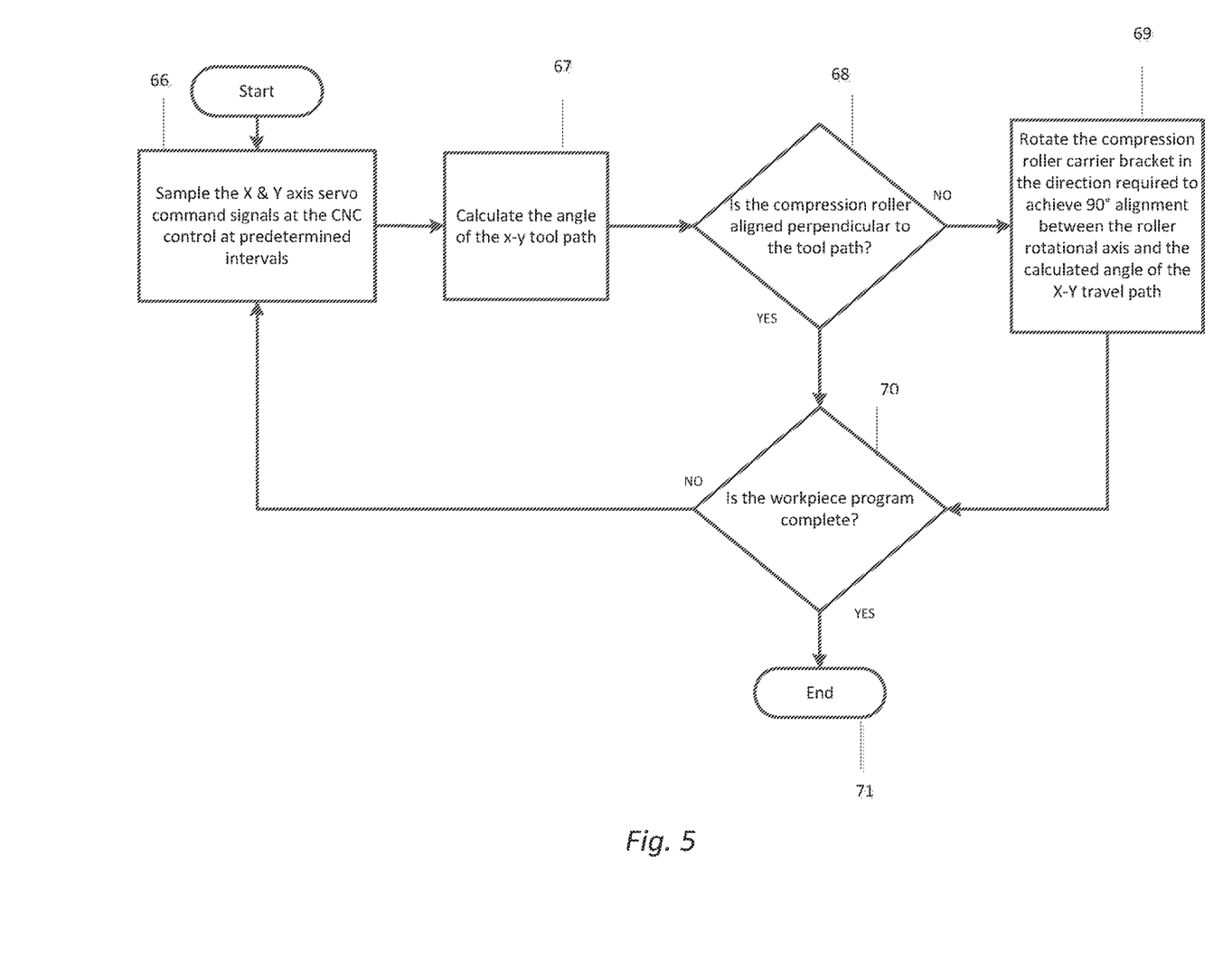
FIG. 5 is a flow chart depicting steps of an exemplary method, according to an aspect of the present disclosure.

FIG. 5 depicts an exemplary method of independently controlling the position of compression roller 59 relative to the direction of the tool path. During operation of machine 1, at an initial step 66, both the x- and y-axis command signals are monitored and/or sampled at predetermined intervals. The intervals may be regular or variable. In some exemplary aspects, the monitoring and/or sampling may be continuous. To perform the sampling and/or monitoring, a program for controlling servomotor 61 may communicate with a program for controlling the tool path, or, in other examples, the direction of the tool path may be detected, e.g., by one or more sensors, and this data may be input into an independent program for controlling servomotor 61. In some aspects, signals sent from a controller of machine 1 to one or more servomotors for controlling the direction of the tool path may also be sampled and/or monitored by the independent system for controlling servomotor 61. Next, at a step 67, an angle of the x-y tool path is calculated based, at least in part, on the monitoring and/or sampling data.

At a step 68, the calculated tool path angle is compared to the position of compression roller 59. During this comparison, it is determined, e.g., whether compression roller 59 is oriented perpendicular to the tool path and/or whether a rotational centerline of compression roller 59 is aligned with the tool path. The tool path angle is compared to a tracking angle of compression roller 59 to determine whether any deviation of the tool path relative to the position of compression roller 59 exists. For example, it is determined whether compression roller 59 is aligned transverse, e.g., perpendicular to, the tool path and the direction of travel of nozzle 51. At a step 69, if it is determined that compression roller 59 is not aligned perpendicular to the tool path and a direction of travel of nozzle 51, the independent servomotor 61 is actuated to adjust the location of compression roller 59 accordingly so that it trails nozzle 51 as it moves in the direction of travel and so that it is oriented perpendicular to the direction of travel of the tool path. That is, compression roller carrier bracket 47 may be rotated in a direction required to achieve a 90-degree alignment between the (longitudinal) rotational axis of compression roller 59 and the angle of the x-y travel path, as calculated previously at a step 67. That is, the independent servo-loop controlling independent servomotor 61, which drives (e.g., angularly rotates) the compression roller carrier-bracket 47, is instructed to rotate servomotor 61 in the direction required to maintain the rotational centerline of the compression roller in orthogonal alignment with the programmed tool path.

If, after step 68, the control system of machine 1 determines the compression roller is aligned perpendicular to the x-y tool path, the machine 1 workpiece program is continued until the program is complete (i.e., until an article or other desired component is formed by machine 1). At a step 70, the sampling of the x- and y-axis command signals continues, looping back to steps 66 through 69, until the program is complete, at which point the independent servo loop program ends, at a final step 71. This configuration may decrease or prevent the occurrence of objectionable servo interactions between the x- and y-axis servomotors and the independent servomotor 61 controlling the compression-roller carrier-bracket 47, because the servo loop controlling roller carrier bracket 47 operates independently of the machine's axis-drive servo system.

It can be appreciated that feedback can be provided to the control system of machine 1 for any of the steps described in detail above.

While steps 66-71 are depicted in a particular order, the principles of the present disclosure are not limited to the order depicted in FIG. 5.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the inventions described herein are not to be considered as limited by the foregoing description.

We claim:

1. An additive manufacturing method, comprising:
   determining x and y coordinates for a tool path of a nozzle of an additive manufacturing machine by sampling command signals generated by the additive manufacturing machine and output to one or more servomotors for controlling a direction of the tool path;
   calculating an angle of the tool path;
   determining a position of a compression roller relative to the angle of the tool path; and
   moving the compression roller to position the compression roller relative to the angle of the tool path, wherein movement of the compression roller relative to the tool path is controlled independent of an operation of a CNC program for controlling movement of the nozzle.

2. The method of claim 1, wherein the command signals are x and y command signals that are sampled by the additive manufacturing machine at predetermined intervals.

3. The method of claim 2, wherein the predetermined intervals are 2 millisecond intervals.

4. The method of claim 1, wherein moving the compression roller comprises aligning a centerline of a rotational axis of the compression roller with the tool path.

5. The method of claim 1, wherein moving the compression roller comprises aligning the compression roller so that a rotational axis of the compression roller is perpendicular to the tool path.

6. The method of claim 1, wherein a first servomotor controls movement of the nozzle along the tool path, and a second servomotor controls movement of the compression roller relative to the tool path.

7. The method of claim 6, wherein the CNC program is a first program that controls movement of the first servomotor, and a second program, independent of the first program, controls movement of the second servomotor.

8. An additive manufacturing method for delivering a flowable material from a nozzle of an additive manufacturing machine, the method comprising:
   moving the nozzle along a tool path by sending x- and y-axis command signals generated by a control system for the additive manufacturing machine and output to a plurality of first servomotors to control movement of the nozzle;
   sampling the x- and y-axis command signals;
   calculating an angle of the tool path with the x- and y-axis command signals;
   determining a position of a compression roller relative to the tool path, wherein the compression roller is configured to follow the nozzle along the tool path; and
   determining when the compression roller is not oriented perpendicular to the tool path, and moving the compression roller so that the compression roller is oriented perpendicular to the tool path based on the determination;
   wherein movement of the compression roller is controlled by a second servomotor independent of the first servomotors.

9. The method of claim 8, wherein a first program controls movement of the first servomotors, and a second program, independent of the first program, controls movement of the second servomotor.

10. The method of claim 8, further comprising moving the compression roller so that a rotational centerline of the compression roller is aligned with the tool path, if the rotational centerline of the compression roller is determined not to be in line with the tool path.

11. The method of claim 8, further comprising discharging a flowable material from the nozzle.

12. The method of claim 11, wherein the flowable material is a thermoplastic resin.

13. The method of claim 11, wherein the compression roller is configured to compress the flowable material discharged from the nozzle.

14. The method of claim 8, wherein moving the compression roller comprises moving a carrier bracket on which the compression roller is mounted.

15. The method of claim 8, wherein the sampling occurs at predetermined intervals.

16. The method of claim 15, wherein the intervals are 2 millisecond intervals.

17. The method of claim 8, wherein the moving, sampling, determining, and moving steps are repeated until a component being manufactured by the CNC machine is completed.

18. The method of claim 1, wherein a servomotor for controlling the movement of the compression roller is controlled by a servo loop that is independent of an operation of the CNC program.

19. The method of claim 1, wherein a servomotor for controlling the movement of the compression roller is controlled by a servo loop that is independent of an operation of the CNC program.

20. The method of claim 19, wherein the additive manufacturing machine includes a gantry and a carriage supported on the gantry, wherein the command signals generated by the CNC program for controlling movement of the nozzle are generated by an additive manufacturing tool-path generating program, the command signals including a command signal to displace the gantry along a first axis and a command signal to display the carriage along a second axis orthogonal to the first axis, and wherein the nozzle is connected to the gantry and to the carriage.

* * * * *